Patented May 12, 1942

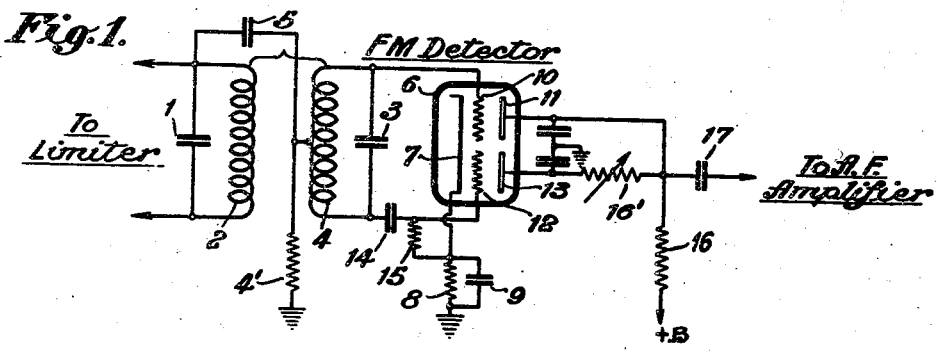
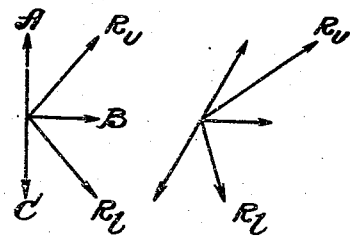  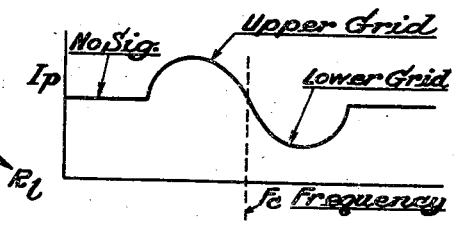
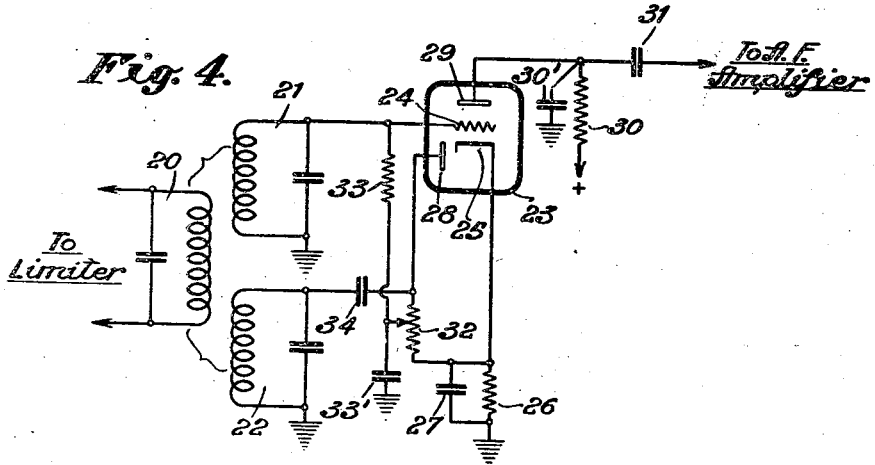
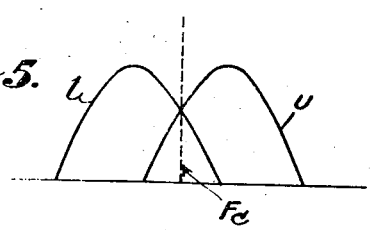

2,282,961

UNITED STATES PATENT OFFICE 2,282,961

FREQUENCY MODULATION DETECTOR CIRCUITS

William A. Harris, Nutley, N. J., assignor to Radio Corporation of America, a corporation of Delaware Application April 23, 1941, Serial No. 389,837

11 Claims. (Cl. 250—27)

My present invention relates to frequency, or phase, modulated carrier wave detection circuits, and more particularly to novel and improved types of balanced detection circuits for angular velocity-modulated carrier waves.

One of the main objects of this invention is to provide a balanced detection network for carrier waves modulated in a manner generically referred to as "angular velocity modulation," the detection network comprising rectifiers of opposed rectification characteristics, and the rectifiers having input circuits whose signal voltages are maximized at different frequencies relative to the center frequency of the applied signal waves.

Another important object of my invention is to provide in association with a frequency discriminator network a pair of rectifiers having opposite rectification characteristics, and the rectifiers having a common output load circuit across which may be developed the modulation existing on the applied frequency, or phase, modulated carrier waves.

Another object of the invention is to provide a rectifier of the plate circuit rectification type and a diode rectifier, the two rectifiers having separate input circuits to which may be applied frequency, or phase, modulated carrier waves, the rectifiers having a common output circuit and the separate input circuits being oppositely tuned relative to the center frequency of the applied carrier waves.

Still another object of my invention is to provide a pair of detectors having a common frequency modulated carrier wave input circuit, one of the detectors being of the plate rectification type, and the other detector being of the grid circuit rectification type, and both detectors having a common output circuit across which is developed the modulation voltage.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 shows a circuit diagram of a detector network embodying the invention,

Figs. 2a, 2b and 2c show vector diagrams which explain the operation of the discriminator of Fig. 1, Fig. 3 shows the detection characteristic of the circuit of Fig. 1, Fig. 4 shows a modified detection network, Fig. 5 shows the detection characteristic of the arrangement in Fig. 4.

Referring now to the accompanying drawing, there is shown in Fig. 1 a detection network which may be employed as the second detector stage of a superheterodyne receiver utilized to receive frequency modulated carrier waves in the present band of 42–50 megacycles (mc.). Those skilled in the art are well acquainted with the construction of such a supeheterodyne receiver, and, therefore, the circuit details between the signal collector device and the limiter output circuit are not shown. It is sufficient to point out that in frequency modulated carrier waves the unmodulated carrier wave has a mid-channel, or center, frequency value which is deviated back and forth, and depends upon the amplitude of the modulating signals. In present practice the assigned channels have a width of 200 kilocycles (kc.), and, therefore, the center frequency ($F_c$) has a permissible deviation of 100 kilocycles (kc.) to either side. As stated before, the amplitude of the audio modulating signal swings the carrier frequency back and forth, whereas the rate of deviation of $F_c$ is determined by the modulation frequencies themselves. As is well known, the detection network functions to derive the modulation signal from the modulated carrier waves, and, therefore, it is essential that to the input network of the detection stage there be applied waves of variable frequency but constant amplitude. Accordingly, there is employed a limiter network prior to the detection network, and the function of the limiter is to eliminate any amplitude variation in the carrier. Usually the limiter is constructed in the manner of a saturated amplifier so that beyond a predetermined carrier input value the output of the stage is substantially constant.

Considering, now, the circuit of Fig. 1, it will be understood that the resonant circuit 1—2 is the output circuit of a limiter stage, and the coil 2 thereof is magnetically coupled to the coil 4 which is in the input circuit of the detection tube. Condenser 3 in shunt with coil 4 tunes circuit 4—3 to the frequency value $F_c$. Of course, in the case of a superheterodyne receiver $F_c$ would be at an intermediate frequency, and would probably be of a value of the order of 4.3 mc., although this invention is in no way restricted to that magnitude. Circuit 1—2 is also tuned to $F_c$. The midpoint of coil 4 is coupled to the high potential side of tuned circuit 1—2 by a coupling condenser 5.

The detection tube is designated by numeral 6 and may include a cathode 7, a pair of grids 10 and 12, and a pair of plates 11 and 13. The cathode 7, the grid 10, and the plate 11 provide one electronic section, while cathode 7, grid 12 and plate 13 provide an independent electron section of the tube. The control grid 10 is connected to one side of tuned circuit 4—3, while the opposite grid 12 is connected through condenser 14 to the opposite side of the tuned input circuit. Cathode 7 is connected to ground through biasing resistor 8, the latter being by-passed for I. F. currents by a condenser 9. The resistor 15, which functions as a grid leak resistor, connects grid 12 to the cathode 7.

The midpoint of coil 4 is connected to ground by resistor 4', and, therefore, provides the path by which negative bias is applied to grid 10. Plates 11 and 13 are connected in common to one end of resistor 16 which is inserted in circuit with the +B terminal of the direct current energizing source. The resistor 16' is included in circuit with plate 13 to match the sensitivities of the two electronic sections. The plate end of resistor 16 is connected to one or more stages of audio amplification by a condenser 17 which has a low impedance to modulation voltage which is developed across load resistor 16. Of course, the audio frequency amplifiers may be followed by any desired type of reproducer. The plates 11 and 13 are each by-passed to ground for I. F. currents.

The grids 10 and 11 are energized by modulated carrier voltages whose relative magnitudes and phases are depicted vectorially in Figs. 2a, 2b and 2c. Considering Fig. 2a, the vector B represents the modulated carrier voltage which is due to the capacity coupling 5. The vectors A and C represent the modulated carrier voltages developed across the two halves of the secondary coil 4 and the transformer 2—4. These induced voltages are always equal in magnitude and opposite in direction; that is, they are 180 degrees out of phase with each other. Hence, at the frequency Fc the resultant vector Ru will be equal in magnitude to the vector sum R1. These vector sum voltages are applied to each of grids 10 and 12. By virtue of the rectification characteristics of each electronic section being opposite, there is produced across load resistor 16 opposite rectified voltages, and, hence, the resultant rectified voltage across resistor 16 is zero at the center frequency of the applied modulated carrier waves.

The rectifiers have opposed rectification characteristics because resistor 8, shunted by condenser 9, cooperates with electron section 7—10—11 to provide a rectifier of the plate rectification type. In other words, this provides a self-bias type of detector circuit which produces an increasing rectified voltage across resistor 16 with increase of applied signal voltage to grid 10. On the other hand, electron section 7—12—13 cooperates with condenser 14 and leak resistor 15 to provide a detector of the grid rectification type which produces across resistor 16 a rectified voltage which decreases with increase in magnitude of carrier voltage applied to grid 12. It will, therefore, be seen that where, as in the case of Fig. 2a, the applied carrier voltages of grids 10 and 12 are equal in magnitude, then the resultant rectified voltage across resistor 16 is zero.

Fig. 2b shows what happens in the case of a deviation of a carrier from the value Fc. In that case there is a phase shift between the vector B and the vectors A—C. This is due to the fact that when the frequency of the applied carrier waves differs from Fc, the voltages induced in each half of coil 4 depart from phase quadrature with the voltage due to capacity coupling 5. Hence, Ru is found to be of greater magnitude than R1, and, therefore, there will be applied to grid 10 modulated carrier voltage which is of greater magnitude than that applied to grid 12.

In Fig. 2c is shown the case where the carrier frequency is deviated to the side of Fc which is opposite from that existing in the case of Fig. 2b. In such case the vector sum R1 is greater than the vector Ru. Hence, the modulated carrier voltage applied to grid 12 exceeds that applied to grid 10.

In Fig. 3 is shown the detection characteristic of the stage, and Ip (plate current) is plotted as ordinates against frequency as abscissae. It will be observed that when no signals are applied to grids 10 and 12 there is a substantially constant plate current flow. However, where the modulation voltage applied to grid 10, the upper grid, predominates there is peak plate current flow, whereas the reverse is true where the voltage applied to grid 12 predominates. It will be noted that the characteristic is typically S shaped, as is required in a detector of frequency modulated carrier waves. In other words, as the modulated carrier waves applied to the detection input circuit deviate from the value Fc, there is produced across resistor 16 rectified voltage whose instantaneous values correspond to the amplitude of the modulating signal applied to the carrier at the transmitter. Of course, the circuit can be adjusted so that the frequency deviations of the carrier relative to Fc do not exceed values which will carry the plate current beyond the peaks on either side of the dotted Fc in Fig. 3.

In Fig. 4 there is shown a modification of the detector stage wherein the output circuit of the limiter tube, which is tuned to Fc, is indicated by numeral 20. The latter is magnetically coupled to each of a pair of independent input circuits 21 and 22. These two resonant circuits 21 and 22 are tuned to opposite frequency values relative to Fc, and the frequency spacing of these resonant circuits is equal. The detector tube is designated by numeral 23, and it is provided with a cathode 25, grid 24 and a plate 29. An auxiliary anode 28 is positioned adjacent cathode 25, and it will be understood that the electron stream to anode 28 is independent of the electron stream flowing to plate 29.

The grid 24 is connected to the high potential side of circuit 21, while the low potential side of the latter is at ground. The cathode 25 is connected to ground through the biasing resistor 26, the latter being shunted by a carrier by-pass condenser 27. The anode 28 is connected to the cathode through a load resistor 32, and the grid 24 may be connected to the resistor 32 by a resistor 33 provided with an adjustable tap slidable along resistor 32. Resistor 33 is connected to ground by by-pass condenser 33'. The input circuit 22 has one side thereof at ground potential while its opposite side is coupled by condenser 34 to the anode end of resistor 32. The load resistor 30 is in circuit with plate 29, and the modulation voltage developed across resistor 30 is transmitted to one or more audio amplifier tubes through the coupling condenser 31. The resistor 30 is by-passed for I. F. currents by condenser 30'.

In Fig. 5 there is shown the characteristic of the discriminator circuit of Fig. 4. Of course, the vectorial explanation of Figs. 2a, 2b, 2c apply equally to Fig. 4. Since the input circuits of grid 24 and anode 28 are equally and oppositely mistuned relative to the value Fc, it will be observed that modulated carrier voltage applied to each of these electrodes 24 and 28 maximize in the manner depicted in Fig. 5. The symbol $l$ in Fig. 5 indicates the variation of the modulated carrier voltage applied to grid 24 as the modulated carrier voltage deviates with respect to Fc, while the curve $u$ indicates the variation of the modulated carrier voltage applied to anode 28. It is pointed out that the discriminator of Fig. 1 can be used with the rectifier tube of Fig. 4.

The electron section 25—24—29 cooperates with the resistor 26 to provide a rectifier of the plate rectification type, while diode 28—25 provides a diode rectifier.

To explain the operation of Fig. 4, the diode 28—25 rectifies I. F. voltage from resonant circuit 22. The grid 24 has applied to it a negative direct current voltage resulting from the diode rectification, and the direct current voltage is developed across resistor 32. The grid 24 also has applied to it I. F. voltage from circuit 21. The I. F. voltage applied to grid 24 acts to increase the plate current of tube 23 by detection action. The negative direct current voltage applied to grid 24 acts to decrease the plate current of tube 23. Consequently the plate current of the tube is a maximum when the I. F. voltage on grid 24 is maximum, and the direct current voltage applied thereto is relatively small. This condition exists, for example, at the peak of curve $l$ of Fig. 5, assuming that circuit 21 is tuned to the peak of curve $l$. In the case of Fig. 2b, this would be the case when the I. F. vector $R_u$ is applied to grid 24. The plate current is a minimum when the direct current voltage applied to grid 24 is a maximum and the I. F. voltage is relatively small. Hence, the plate current of tube 23 may be represented by a curve similar to that shown in Fig. 3. The adjustable resistor 32 functions in the same manner as resistor 16' of Fig. 1. That is, it provides the means for adjusting the input to one of the detection devices so that the output can be symmetrically matched to that of the other detection devices. The arrangement of Fig. 4 gives amplification in addition. If more gain is required out of the network a diode-pentode tube may be used, and the pentode section would replace the triode section of tube 23.

While I have indicated and described several systems for varying my invention into effect, it will be apparent to one skilled in the art that my invention is by no means limited to the particular organizations shown and described, but that many modifications may be made without departing from the scope of my invention, as set forth in the appended claims.

What I claim is:

1. In combination with a source of angular velocity modulated carrier waves, a detection network comprising a pair of electron discharge devices, each device having an input electrode and an output electrode, means, connected between said source and the input electrode of each of said devices, for applying to the input electrodes carrier voltages whose relative magnitudes are a function of the frequency deviation of the center frequency of said waves, means operatively associated with one device to render it operative as a plate rectification detector whereby its detected output varies directly with carrier voltage magnitude, means operatively associated with the second device to impart to it a detection characteristic such that its detected output varies inversely with carrier voltage magnitude, and a common load element connected to the output electrodes of both devices.

2. In combination with a source of angular velocity modulated carrier waves, a detection network comprising a pair of electron discharge devices, each device having an input electrode and an output electrode, means, connected between said source and the input electrode of each of said devices, for applying to the input electrodes carrier voltages whose relative magnitudes are a function of the frequency deviation of the center frequency of said waves, said applying means comprising at least two reactively coupled circuits each tuned to said center frequency, means operatively associated with one device to render it operative as a plate rectification detector whereby its detected output varies directly with carrier voltage magnitude, means operatively associated with the second device to impart to it a detection characteristic such that its detected output varies inversely with carrier voltage magnitude, and a common load element connected to the output electrodes of both devices.

3. In combination with a source of angular velocity modulated carrier waves, a detection network comprising a pair of electron discharge devices, each device having an input electrode and an output electrode, means, connected between said source and the input electrode of each of said devices, for applying to the input electrodes carrier voltages whose relative magnitudes are a function of the frequency deviation of the center frequency of said waves, means operatively associated with one device to render it operative as a plate rectification detector whereby its detected output varies directly with carrier voltage magnitude, means operatively associated with the second device to impart to it a detection characteristic such that its detected output varies inversely with carrier voltage magnitude, and a common load element connected to the output electrodes of both devices, both of said devices being triodes, and said second device characteristic being that of a grid rectification detector.

4. In a detection network for frequency modulated waves, a pair of electron discharge devices, each device having an input electrode and an output electrode, a wave input circuit connected to the input electrode of each device, said input circuit being constructed and arranged to apply frequency modulated carrier voltage to each input electrode in such manner that the relative magnitudes of the carrier voltages is dependent on the deviation of the applied wave center frequency, means connected to one of said devices to render it operative as a rectifier of a predetermined characteristic such that its rectified output varies in a predetermined direction upon a rise in carrier voltage magnitude, means connected to the second device to render it operative as a rectifier whose rectified output varies in a direction opposite to said predetermined direction upon a rise in carrier voltage magnitude at least at said center frequency, and a common output impedance connected to the output electrodes of both devices across which is developed the modulation voltage.

5. In a detection network for frequency modulated waves, a pair of electron discharge devices, each device having an input electrode and an output electrode, a wave input circuit connected to the input electrode of each device, said input circuit being constructed and arranged to apply frequency modulated carrier voltage to each input electrode in such manner that the relative magnitudes of the carrier voltages is dependent on the deviation of the applied wave center frequency, means connected to one of said devices to render it operative as a rectifier of a predetermined characteristic, such that its rectified output varies in a predetermined direction upon a rise in carrier voltage magnitude, means connected to the second device to render it operative as a rectifier whose rectified output varies in a direction opposite to said predetermined direction upon a rise in carrier voltage magintude at least at said center frequency, a common tube envelope housing the electrodes of both devices, and a common output impedance connected to the output electrodes of both devices across which is developed the modulation voltage.

6. In a detection network for frequency modulated waves, a pair of electron discharge devices, each device having an input electrode and an output electrode, a wave input circuit connected to the input electrode of each device, said input circuit being constructed and arranged to apply frequency modulated carrier voltage to each input electrode in such manner that the relative magnitudes of the carrier voltages is dependent on the deviation of the applied wave center frequency, means connected to one of said devices to render it operative as a rectifier of a predetermined characteristic such that its rectified output varies in a predetermined direction upon a rise in carrier voltage magnitude, means connected to the second device to render it operative as a rectifier whose rectified output varies in a direction opposite to said predetermined direction upon a rise in carrier voltage magnitude at least at said center frequency, and a common output impedance connected to the output electrodes of both devices across which is developed the modulation voltage, and means for adjusting the relative sensitivities of said devices to obtain a symmetrical output characteristic.

7. In combination with a source of angular velocity modulated carrier waves, a detection network comprising a pair of electron discharge devices, each device having an input electrode and an output electrode, means, connected between said source and the input electrode of each device, for applying to the input electrodes carrier voltages whose relative magnitudes are a function of the frequency deviation of the center frequency of said waves, means operatively associated with one device to render it operative as a plate rectification detector whereby its detected output varies directly with carrier voltage magnitude, means operatively associated with the second device to impart to it a detection characteristic such that its detected output varies inversely with carrier voltage magnitude, a common load element connected to the output electrodes of both devices, and means for adjusting the input to one of said devices so that the output thereof can be symmetrically matched to that of the other.

8. In combination with a source of frequency modulated carrier waves, substantially free of amplitude modulation, a detection network comprising a pair of triode devices, each device having an input electrode and an output electrode, means, connected between said source and the input electrode of each of said devices, for applying to the input electrodes carrier voltages whose relative magnitudes are a function of the frequency deviation of the center frequency of said waves, means connected with the input electrode of one device to render it operative as a plate rectification detector, means connected with the input electrode of the second device to render it operative as a grid rectification detector, and a common load element connected to the output electrodes of both triode devices.

9. In combination with a source of frequency modulated carrier waves, a detection network comprising a pair of electron discharge devices, one device having an input electrode, cathode and an output electrode, the second device being a diode, means, connected between said source and the input electrode of each of said devices, for applying to the input electrodes carrier voltages whose relative magnitudes are a function of the frequency deviation of the center frequency of said waves, means operatively associated with said one device to render it operative as a plate rectification detector, means connected with the diode to render it operative as a rectification network, a common load element connected to the output electrodes of both devices, and a direct current voltage connection between said diode rectification network and said one device input electrode.

10. In combination with a source of angular velocity modulated carrier waves, a detection network comprising a pair of electron discharge devices, each device having an input electrode and an output electrode, means, connected between said source and the input electrode of each of said devices, for applying to the input electrodes carrier voltages whose relative magnitudes are a function of the frequency deviation of the center frequency of said waves, means operatively associated with one device to render it operative as a plate rectification detector, means operatively associated with the second device to render it operative as a grid rectification detector, a common load element connected to the output electrodes of both devices, both of said devices having a common cathode.

11. In a detection network for frequency modulated waves, a pair of electron discharge devices, each device having an input electrode and an output electrode, one of said devices being of the diode type, a wave input circuit connected to the input electrode of each device, said input circuit being constructed and arranged to apply frequency modulated carrier voltage to each input electrode in such manner that the relative magnitudes of the carrier voltages is dependent on the deviation of the applied wave center frequency, means connected to said diode device to render it operative as a rectifier, means connected to the second device to render it operative as a detector whose detected output increases with carrier voltage increase, a common output impedance connected to the output electrodes of both devices across which is developed the modulation voltage, and a control connection from said diode rectifier to said second device.

WILLIAM A. HARRIS.